(12) United States Patent
Honma et al.

(10) Patent No.: US 12,386,165 B2
(45) Date of Patent: Aug. 12, 2025

(54) MICROSCOPE UNIT

(71) Applicant: MITUTOYO CORPORATION, Kanagawa (JP)

(72) Inventors: Takashi Honma, Kanagawa (JP); Yasushi Fukumoto, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 621 days.

(21) Appl. No.: 17/752,304

(22) Filed: May 24, 2022

(65) Prior Publication Data

US 2022/0382033 A1    Dec. 1, 2022

(30) Foreign Application Priority Data

May 25, 2021   (JP) ................. 2021-088020

(51) Int. Cl.
| | |
|---|---|
| G02B 21/04 | (2006.01) |
| G02B 3/00 | (2006.01) |
| G02B 13/00 | (2006.01) |
| G02B 21/08 | (2006.01) |
| G02B 21/36 | (2006.01) |
| G02B 27/10 | (2006.01) |

(52) U.S. Cl.
CPC .......... *G02B 21/04* (2013.01); *G02B 3/0037* (2013.01); *G02B 13/0095* (2013.01); *G02B 21/082* (2013.01); *G02B 21/361* (2013.01); *G02B 21/362* (2013.01); *G02B 27/1013* (2013.01); *G02B 2003/0093* (2013.01)

(58) Field of Classification Search
None
See application file for complete search history.

(56) References Cited

U.S. PATENT DOCUMENTS

| | | | |
|---|---|---|---|
| 6,507,434 B2 | 1/2003 | Miyashita | |
| 8,760,757 B2 | 6/2014 | Kawasaki | |
| 9,347,852 B1* | 5/2016 | DiMatteo | ............ G02B 21/082 |
| 10,802,258 B2 | 10/2020 | Miyake et al. | |
| 2009/0091822 A1* | 4/2009 | Suzuki | ................ G02B 21/025 359/380 |

(Continued)

FOREIGN PATENT DOCUMENTS

| | | |
|---|---|---|
| JP | 2002-6225 | 1/2002 |
| JP | 2011-209428 A | 10/2011 |

(Continued)

*Primary Examiner* — Richard H Kim
(74) *Attorney, Agent, or Firm* — Rankin, Hill & Clark LLP

(57) ABSTRACT

A microscope unit comprises: a main lens barrel of an imaging optical system; and an illumination lens barrel of an illumination optical system connected to the main lens barrel, the illumination optical system having: a collector lens that collects light that has been irradiated from a light source; a fly-eye lens allowing to be transmitted therethrough light from the collector lens; a first relay lens having lenses that relay light from the fly-eye lens; a field stop that stops down a range of light from the first relay lens; a second relay lens that relays to a beam splitter light from the first relay lens; and the beam splitter guiding at least a part of light incident thereon to the objective lens and allowing to be transmitted therethrough to a side of an imaging sensor at least a part of light incident thereon from the objective lens.

15 Claims, 4 Drawing Sheets

(56) References Cited

U.S. PATENT DOCUMENTS

| | | | | |
|---|---|---|---|---|
| 2012/0038978 | A1* | 2/2012 | Tanabe | G02B 21/245 |
| | | | | 359/372 |
| 2013/0128345 | A1* | 5/2013 | Kajitani | G02B 21/20 |
| | | | | 359/380 |
| 2018/0231755 | A1* | 8/2018 | Miyake | G02B 27/0961 |
| 2020/0319454 | A1* | 10/2020 | Lai | G02B 23/22 |
| 2022/0382032 | A1 | 12/2022 | Iwamoto et al. | |

FOREIGN PATENT DOCUMENTS

| | | |
|---|---|---|
| JP | 1708088 S | 2/2022 |
| JP | 2022-181143 A | 12/2022 |
| WO | 2017/068627 A1 | 4/2017 |

* cited by examiner

MICROSCOPE UNIT

CROSS-REFERENCE TO RELATED APPLICATIONS

This application is based upon and claims the benefit of Japanese Patent Application No. 2021-088020, filed on May 25, 2021, the entire contents of which are incorporated herein by reference.

BACKGROUND

Field

The present invention relates to a microscope unit capable of being fitted to a target device.

Description of the Related Art

Up to now, there has been known a microscope unit comprising: a main lens barrel of an imaging optical system, the main lens barrel being configured capable of being fitted with an imaging sensor and an objective lens; and an illumination lens barrel of an illumination optical system, the illumination lens barrel being connected to the main lens barrel and configured capable of being fitted with a light source. Such a microscope unit is configured so that, for example, a light flux (a flux of diverging light rays) that has been emitted from the light source is collected by a collector lens, passes through a relay lens system and field stop to be reflected by a mirror, and passes through a relay lens system, aperture stop, and condenser lens to illuminate an observation surface.

Such a microscope unit is sometimes capable of being fitted with a variety of light sources. However, it has sometimes been the case that, depending on a kind of light source fitted to the microscope unit, illumination at the observation surface ends up getting ununiform. Accordingly, for example, in a microscope illumination device described in Japanese Patent Application Publication No. 2002-6225, a fly-eye lens is disposed in the illumination optical system, whereby uniformity of illumination at the observation surface is achieved.

DETAILED DESCRIPTION

Figure 1:
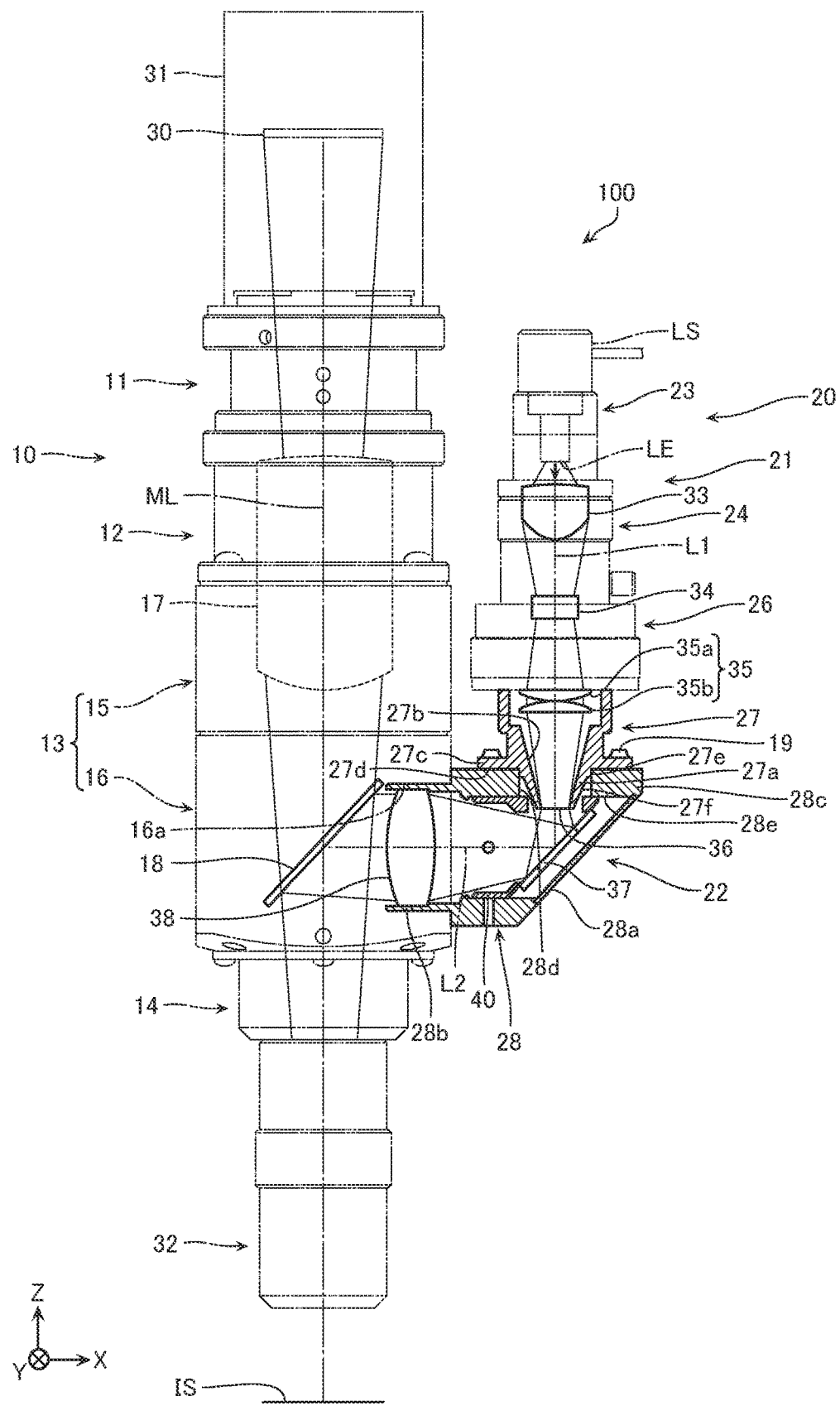
FIG. 1 is a schematic explanatory diagram showing overall configuration of a microscope unit according to a first embodiment.

In the above-described microscope illumination device, the fly-eye lens needs to be provided in the illumination optical system. Moreover, a relay lens needs to be provided between the fly-eye lens and the field stop in order to relay light from the fly-eye lens. In such a configuration, a certain degree of length needs to be secured as a focal distance from the relay lens to the field stop. There is a risk that this will end up leading to an increase in size of the illumination lens barrel accompanying an increase in optical path length of the illumination lens barrel and, consequently, will end up leading to an increase in size of the microscope unit.

The present invention, which was made in view of such a problem, has an object of providing a microscope unit that enables downsizing of an illumination lens barrel overall to be achieved, and, consequently, enables downsizing of the microscope unit to be achieved.

A microscope unit according to one embodiment of the present invention comprises: a main lens barrel of an imaging optical system, the main lens barrel being configured capable of being fitted with an imaging sensor and an objective lens; and an illumination lens barrel of an illumination optical system, the illumination lens barrel being connected to the main lens barrel and configured capable of being fitted with a light source, the illumination optical system having: a collector lens that collects light that has been irradiated from the light source; a fly-eye lens allowing to be transmitted therethrough light from the collector lens; a first relay lens that relays light from the fly-eye lens; a field stop that stops down a range of light from the first relay lens; a second relay lens that relays to a beam splitter light from the first relay lens; and the beam splitter provided on an optical axis of the main lens barrel, the beam splitter guiding at least a part of light incident thereon to the objective lens and allowing to be transmitted therethrough to a side of the imaging sensor at least apart of light incident thereon from the objective lens. Moreover, the first relay lens has a plurality of lenses that are not joined to each other.

In this kind of microscope unit, the first relay lens of the illumination optical system is configured by a plurality of lenses that are not joined to each other. Hence, it is possible for a focal distance from the first relay lens to the field stop to be shortened compared to when, for example, the first relay lens has been configured by a single lens or by a cemented lens regarded as one lens. This makes it possible for optical path length of the illumination lens barrel to be reduced, whereby total length of the illumination lens barrel is configured short, downsizing of the illumination lens barrel overall is achieved, and, consequently, downsizing of the microscope unit is achieved.

Distance in an optical path from the first relay lens to the second relay lens may be no more than five times an outer diameter of the second relay lens.

The above-described first relay lens may have a first lens and a second lens that each consist of a plano-convex lens. Moreover, the first lens and the second lens may be disposed so that their fellow convex surfaces face each other.

The above-described microscope unit may have a reflecting mirror which is disposed between the field stop and the second relay lens, and reflects light from the first relay lens toward the main lens barrel. In such a case, the second relay lens may be configured so as to relay to the beam splitter light that has been reflected by the reflecting mirror.

The above-described illumination lens barrel may have: a first lens barrel configured capable of being fitted with the light source; and an intermediate lens barrel connecting the main lens barrel and the first lens barrel. In such a case, a configuration may be adopted such that the first lens barrel houses the collector lens, the fly-eye lens, and the first relay lens, the intermediate lens barrel houses the field stop, the second relay lens, and the reflecting mirror, and the main lens barrel houses the beam splitter.

The above-described reflecting mirror may be housed in the intermediate lens barrel in a state of being held in a mirror frame member.

Moreover, the field stop may be disposed more inwardly than an outer peripheral surface of the mirror frame member is, and may be part of the first lens barrel.

Such a configuration makes it possible to provide a microscope unit that enables downsizing of an illumination lens barrel overall to be achieved, and, consequently, enables downsizing of the microscope unit to be achieved.

Microscope units according to several embodiments of the present invention will be described in detail below with reference to the accompanying drawings. However, the embodiments below are not to limit the inventions according to each of the claims, moreover, not all of the combinations of features described in the embodiments are necessarily essential to the means for solving the problem of the invention. Note that in the embodiments below, scales, dimensions, and so on of each of configuring elements are sometimes shown expanded, and some of the configuring elements are sometimes omitted.

Moreover, in the description below, an "X axis direction" means a left-right direction in the case of having correctly faced the paper surface (front surface) of a microscope unit shown in FIG. 1, a "Y axis direction" means a depth direction in same case, and a "Z axis direction" means an up-down direction, that is, an optical axis direction of a main lens barrel in same case. Note that basic structure of a microscope unit is already known, so, apart from where necessary, overall configuration will be described here in outline only.

First Embodiment (Configuration)

Figure 2:
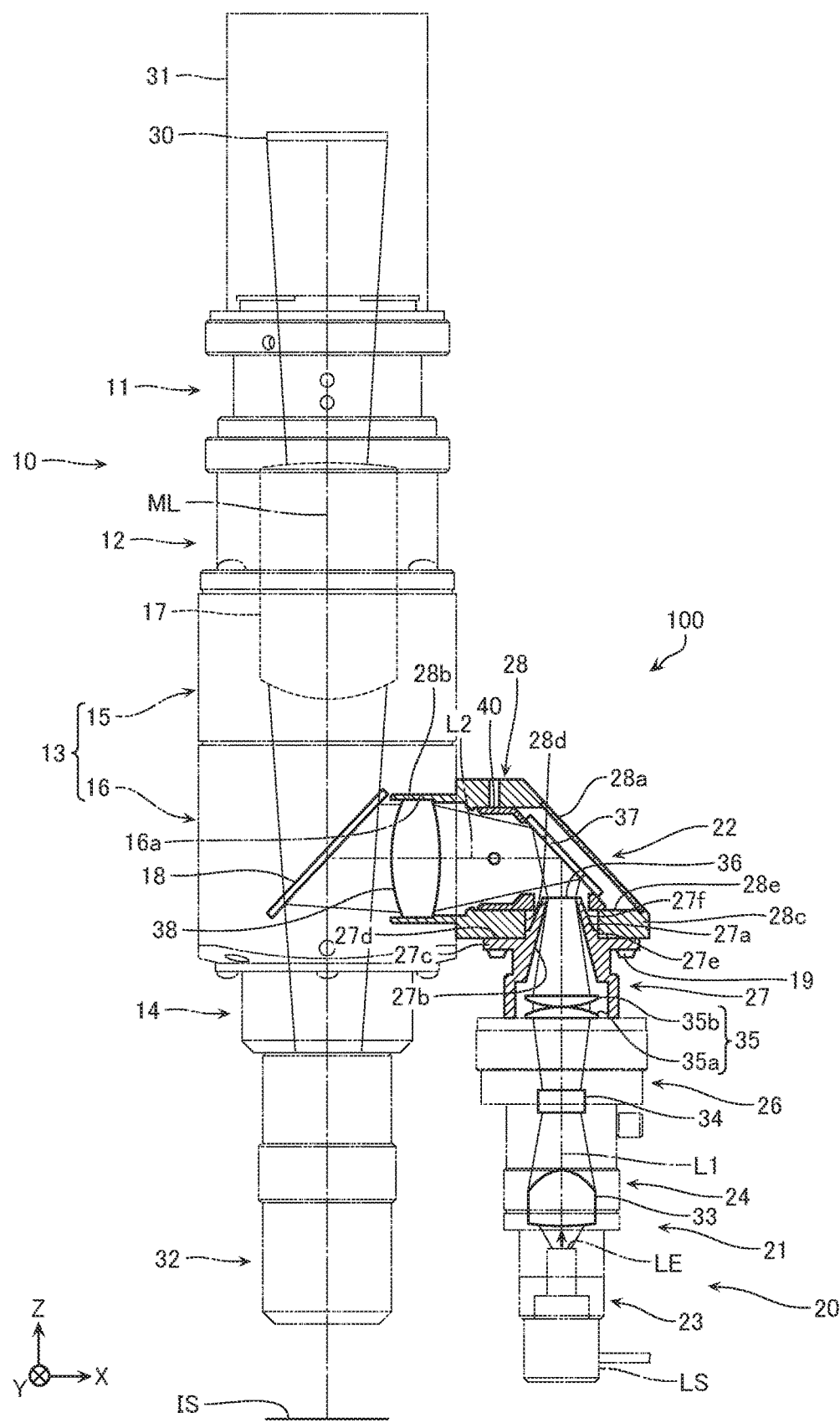
FIG. 2 is a schematic explanatory diagram showing overall configuration of the microscope unit.

FIGS. 1 and 2 are schematic explanatory diagrams showing overall configuration of a microscope unit 100 according to a first embodiment. In FIGS. 1 and 2, the microscope unit 100 has its illumination optical system depicted by solid lines, and, moreover, is partly shown as a cross-sectional view, and partly shown as a transparency view. FIG. 2 shows a situation where attitude with respect to a main lens barrel 10 of an illumination lens barrel 20 differs by 180° compared to in FIG. 1. Hereafter, description will be made assuming a state shown in FIG. 1 to be a basic attitude of the microscope unit 100.

As shown in FIGS. 1 and 2, the microscope unit 100, which configures part of an unillustrated microscope, comprises: the main lens barrel 10; and the illumination lens barrel 20 which is connected to the main lens barrel 10.

The main lens barrel 10, which configures a so-called imaging optical system of the microscope, is for example configured so that its end portion on an upper side in the Z axis direction exemplified in FIG. 1 (hereafter, simply called "upper side") is capable of being fitted with a camera 31 incorporating an imaging sensor 30, and its end portion on a lower side in the Z axis direction exemplified in FIG. 1 (hereafter, simply called "lower side") is capable of being fitted with an objective lens 32. Note that the imaging sensor 30 includes various kinds of image sensors (CMOS, CCD), and so on.

The main lens barrel 10 has: a first sleeve portion 11 of cylindrical shape disposed on the upper side (a camera 31 side); and a second sleeve portion 12 of cylindrical shape disposed on a lower side of this first sleeve portion 11. The first sleeve portion 11 is formed so that its minimum outer diameter will be slightly smaller than a minimum outer diameter of the second sleeve portion 12.

Moreover, the main lens barrel 10 has: a case of main body portion 13 of rectangular-shaped outward appearance disposed on a lower side of the second sleeve portion 12; and a third sleeve portion 14 of cylindrical shape disposed on a lower side of this case of main body portion 13 and being connected with the objective lens 32. Note that the case of main body portion 13 is configured by: a first casing 15; and a second casing 16 which is disposed on a lower side of this first casing 15.

On insides of the second sleeve portion 12 and the first casing 15 of the case of main body portion 13 in the main lens barrel 10, there is housed an imaging lens (a tube lens) 17. Moreover, on an inside of the second casing 16 of the case of main body portion 13 in the main lens barrel 10, a beam splitter (hereafter, written as "B/S") 18 that will be mentioned later is housed so as to incline at a certain angle to an optical axis ML of the main lens barrel 10. These first sleeve portion 11, second sleeve portion 12, case of main body portion 13, and third sleeve portion 14 configuring the main lens barrel 10 are coaxially disposed linearly in the Z axis direction, along the optical axis ML of the main lens barrel 10.

The illumination lens barrel 20, which configures the so-called illumination optical system of the microscope, has: a first lens barrel 21 capable of having a variety of light sources LS fitted in a freely attachable/detachable manner to its end portion on the upper side in the Z axis direction in the basic attitude; and an intermediate lens barrel 22 that connects this first lens barrel 21 to the main lens barrel 10. Note that the first lens barrel 21 has its optical axis L1 formed in the Z axis direction, and the intermediate lens barrel 22 has its optical axis L2 formed in the X axis direction.

The first lens barrel 21 has: a fourth sleeve portion 23 of cylindrical shape disposed on the upper side in the basic attitude; and a fifth sleeve portion 24 of cylindrical shape disposed on a lower side of this fourth sleeve portion 23. Note that the fourth sleeve portion 23 is formed so that its minimum outer diameter will be smaller than a minimum outer diameter of the fifth sleeve portion 24.

Moreover, the first lens barrel 21 has: a coupler case of portion 26 of stepped annularly shaped outward appearance disposed on a lower side of the fifth sleeve portion 24; and a sixth sleeve portion 27 of stepped cylindrically shaped outward appearance disposed on a lower side of the coupler case of portion 26. The coupler case of portion 26 couples the fifth sleeve portion 24 and the sixth sleeve portion 27. Note that part of the sixth sleeve portion 27 (a portion thereof disposed within the intermediate lens barrel 22) configures a truncated conical portion 27a which is formed in a downwardly tapering truncated conical shape. Although in the example illustrated, outer diameters of the fifth sleeve portion 24 and the sixth sleeve portion 27 are shown substantially the same and a minimum outer diameter of the coupler case of portion 26 is shown larger than these outer diameters, outer diameters of the fifth sleeve portion 24, the coupler case of portion 26, and the sixth sleeve portion 27 may be configured to be substantially the same.

On an inside of the fourth sleeve portion 23 in the first lens barrel 21, there is housed a light-emitting end LE of the fitted light source LS. Moreover, the fifth sleeve portion 24 in the first lens barrel 21 houses on its inside on the upper side a collector lens (a light-collecting lens) 33. Furthermore, on an inside of a connecting point of the fifth sleeve portion 24 and the coupler case of portion 26, there is housed a fly-eye lens 34.

The sixth sleeve portion 27 in the first lens barrel 21 houses on its inside on the upper side a first relay lens group 35 acting as a first relay lens. The first relay lens group 35 has a plurality of lenses that are not joined to each other. For example, in the example illustrated, the first relay lens group 35 comprises: a first lens 35a consisting of a plano-convex lens having its convex surface directed to the lower side in the Z axis direction; and a second lens 35b consisting of a plano-convex lens having its convex surface directed to the upper side in the Z axis direction. These first lens 35a and second lens 35b are disposed so that their fellow convex surfaces face each other. The first lens 35a and the second lens 35b may be disposed separated from each other, or may have parts of their convex surfaces in contact with each other. Such a configuration enables a focal distance to a later-mentioned field stop 36 to be made smaller while at the same time enabling an amount of spherical aberration to be suppressed more, compared to when, for example, a single lens or a biconvex lens of the likes of a cemented lens is adopted as the first relay lens. This is because magnitude of refractive power as a lens system can be shared by each of the lenses, that is, the first lens 35a and the second lens 35b. Moreover, a plano-convex lens is manufacturable at a cheaper price compared to the likes of an aspherical lens separately requiring an initial molding fee, so enables manufacturing costs of the illumination optical system to be suppressed too.

Note that an inner peripheral surface 27b more to the lower side than a housing place of the first relay lens group 35 of the sixth sleeve portion 27 in the first lens barrel 21 is formed in a tapered shape whose diameter gradually decreases in a downward direction. Moreover, part of an outer peripheral portion of the sixth sleeve portion 27 has formed therein a flange portion 27c of annular shape projecting in an outer peripheral direction.

Further to the lower side than a lower end surface 27d of the flange portion 27c of the sixth sleeve portion 27 in the first lens barrel 21, an outer peripheral portion 27e whose diameter is smaller than a minimum outer diameter of the sixth sleeve portion 27 is passed, and a stepped portion formed still further below is traversed, whereat there is disposed an outer peripheral portion 27f of the truncated conical portion 27a, that is formed in a tapered shape whose diameter gradually decreases in a downward direction.

Note that the fourth sleeve portion 23, fifth sleeve portion 24, coupler case of portion 26, and sixth sleeve portion 27 configuring the first lens barrel 21 are linearly coaxially disposed along the optical axis L1 of the first lens barrel 21. Moreover, a lower end portion of the truncated conical portion 27a of the sixth sleeve portion 27 configures the field stop 36. That is, the field stop 36 in the illumination lens barrel 20 of the first embodiment is configured by part of the first lens barrel 21 (a lower end portion of the truncated conical portion 27a).

The intermediate lens barrel 22 connects the first lens barrel 21 and the main lens barrel 10 and has an intermediate case of portion 28 of rectangular outward appearance that, in the basic attitude, has formed therein on a side of its end portion separated in the X axis direction from the main lens barrel 10 an inclined wall 28a inclining obliquely downwardly from the upper side toward the main lens barrel 10.

Note that an end portion on a side of the main lens barrel 10 in the X axis direction of the intermediate case of portion 28 is formed as a mating cylindrical portion 28b of cylindrical shape, and is mated with a mating portion 16a which is hole-like, formed in the second casing 16 of the case of main body portion 13. As a result, the intermediate lens barrel 22 is connected to the main lens barrel 10 so as to be capable of revolving around the optical axis L2 orthogonal to the optical axis L1 of the first lens barrel 21, with respect to the main lens barrel 10 (refer to FIG. 2). Note that a second relay lens 38 is housed on an inside of the mating cylindrical portion 28b.

Moreover, an upper wall portion 28c of the intermediate case of portion 28 in the basic attitude has formed therein a mating hole 28d with which the sixth sleeve portion 27 of the first lens barrel 21 is mated. That is, the sixth sleeve portion 27 is mated with the intermediate case of portion 28 in such a state that the lower end surface 27d of the flange portion 27c abuts on an outer wall surface of the upper wall portion 28c and the outer peripheral portion 27e catches on an inner peripheral surface on an opening end side of the mating hole 28d.

Note that the sixth sleeve portion 27 is fixed to the intermediate case of portion 28 by the flange portion 27c being fitted to the upper wall portion 28c by fitting bolts 19. As a result, the first lens barrel 21 is fixed after having been positioned with respect to the intermediate lens barrel 22. This configuration results in the first lens barrel 21 being fixed in this way to the intermediate lens barrel 22, so leads to the above-mentioned field stop 36 of the first lens barrel 21 being disposed more inwardly than an outer peripheral surface of the intermediate lens barrel 22 (the outer wall surface of the upper wall portion 28c of the intermediate case of portion 28) is.

Moreover, the intermediate lens barrel 22 has housed therein: a reflecting mirror 37; and a mirror frame member 40 that holds this reflecting mirror 37. Moreover, the intermediate lens barrel 22 is provided with a position adjusting mechanism (not illustrated) for adjusting a position of fitting to the intermediate lens barrel 22 (a position of fitting to the intermediate case of portion 28) of the mirror frame member 40.

Figure 3:
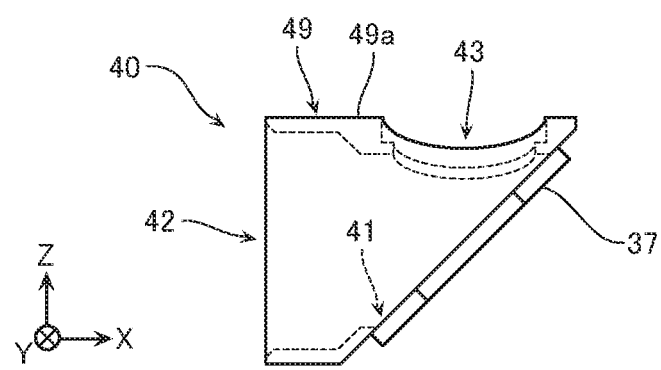
FIG. 3 is a schematic side view showing configuration of a mirror frame member of the microscope unit.

FIG. 3 is a schematic side view showing configuration of the mirror frame member 40 of the microscope unit 100. Moreover, FIG. 4 is a schematic perspective view showing configuration of the mirror frame member 40 of the microscope unit 100.

Figure 4:
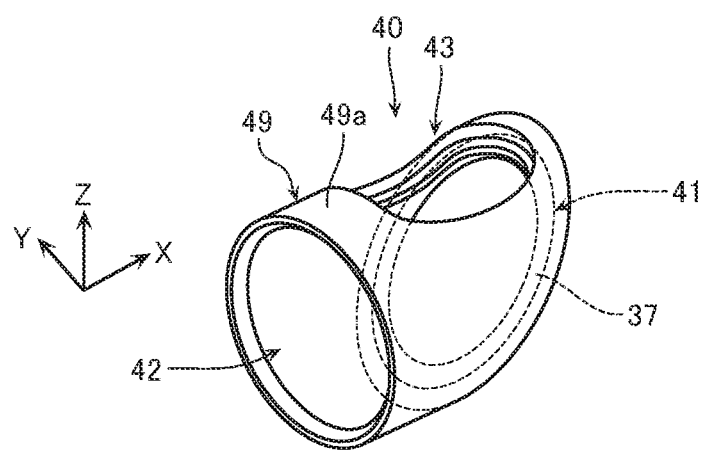
FIG. 4 is a schematic perspective view showing configuration of the mirror frame member of the microscope unit.

As shown in FIGS. 3 and 4, the mirror frame member 40 is formed by a frame body 49 that, so as to allow the mirror frame member 40 to be housed inside the intermediate case of portion 28, has a cylindrical shape of a kind that one end portion side thereof has been obliquely cut. The frame body 49 of the mirror frame member 40 holds the reflecting mirror 37. This reflecting mirror 37 is formed with an elliptical or polygonal (octagonal, or the like) outer shape, for example, so that its reflecting portion will have an elliptical shape matching a shape of an elliptical opening portion 41 of the frame body 49. Moreover, a portion excluding the above-described reflecting portion, of this reflecting mirror 37 is adhered to the frame body 49 of the mirror frame member 40 via the likes of an unillustrated adhesive, for example.

Moreover, the frame body 49 of the mirror frame member 40 has: a main lens barrel side opening portion 42 formed at an end portion on an opposite side in the X axis direction to the elliptical opening portion 41, of the frame body 49; and a first lens barrel side opening portion 43 formed at a position separated in the Z axis direction from the elliptical opening portion 41, looking from the elliptical opening portion 41. The first lens barrel side opening portion 43 has an opening diameter larger than an outer diameter of the field stop 36 of the truncated conical portion 27a in the sixth sleeve portion 27 of the first lens barrel 21 and larger than an outer diameter of the outer peripheral portion 27f in a certain range on the upper side in the Z axis direction from the field stop 36. As a result, the field stop 36 can be disposed brought as close as is possible to the reflecting mirror 37, without the frame body 49 of the mirror frame member 40 interfering with the truncated conical portion 27a of the sixth sleeve portion 27.

Note that after the mirror frame member 40 thus configured has been housed inside the intermediate case of portion 28, the mirror frame member 40 has its fitting position adjusted with respect to the intermediate case of portion 28 by the unillustrated position adjusting mechanism. Although illustration of the position adjusting mechanism is omitted, it is configured by a plurality of adjustment screws that have been screwed into a pair of seating countersunk holes drilled in the Y axis direction in the intermediate case of portion 28, for example. After adjustment of the fitting position, the mirror frame member 40 is fixed to the intermediate case of portion 28 by screw fixing, for example.

Note that since the thus formed intermediate lens barrel 22 and the separately assembled first lens barrel 21 can be integrated by a simple structure only of the flange portion 27c being fixed by screw fixing to the intermediate case of portion 28 by the fitting bolts 19 in a state of the truncated conical portion 27a having been inserted in the mating hole 28d, it is possible for the illumination lens barrel 20 to be easily manufactured.

(Optical Systems)

The imaging optical system of the microscope unit 100 according to the present embodiment comprises the objective lens 32 and the imaging lens (tube lens) 17. Moreover, the illumination optical system of the microscope unit 100 according to the present embodiment comprises the collector lens (light-collecting lens) 33, the fly-eye lens 34, the first relay lens group 35, the field stop 36, the reflecting mirror 37, the B/S 18, and the second relay lens 38.

The light-emitting end LE of the light source LS, a position of seating of the objective lens 32 (a pupil of the objective lens 32), and an emitting end surface of the fly-eye lens 34 are in a conjugate relationship. Moreover, these positions are not in a conjugate relationship with the B/S 18 and the reflecting mirror 37. Moreover, the field stop 36, a focal position of the objective lens 32, and a focal position of the imaging lens 17 are in a conjugate relationship.

A light flux (a flux of diverging light rays) from the light-emitting end LE of the light source LS is converted into a collected light flux (a flux of focused light rays) via the collector lens 33, and passes through the fly-eye lens 34 to be divided into the same number as there are a plurality of lenses configuring the fly-eye lens 34. As a result, the emitting end surface of the fly-eye lens 34 has formed therein the same number of light source images as there are a plurality of lenses configuring the fly-eye lens 34 (secondary light sources), and light fluxes (fluxes of diverging light rays) emitted for each of the plurality of lenses configuring the fly-eye lens 34 pass through the first relay lens group 35 to be relayed collected overlapping each other on the field stop 36 separated by the designed focal distance. Hence, the emitting end surface of the fly-eye lens 34 has formed therein a pseudo surface light source (secondary light source) having substantially uniform light distribution characteristics with little light distribution variation, even when a variety of light sources LS having different light distribution characteristics have been employed.

A light flux (a flux of diverging light rays) that has passed through the field stop 36 along the optical axis L1 and had its range of light stopped down, is reflected so as to become a light flux (a flux of diverging light rays) along the optical axis L2 by the reflecting mirror 37 in the intermediate lens barrel 22, and, having passed through the second relay lens 38 to undergo light collection, is relayed to be irradiated onto the B/S 18. Note that the B/S 18 guides at least a part of the light flux (the flux of focused light rays) that has passed through the second relay lens 38 to be incident on the B/S 18 reflecting it to a side of an unillustrated aperture stop and the objective lens 32, and allows to be transmitted through the B/S 18 to a side of the imaging lens 17 at least a part of a light flux from an imaging surface IS that has passed through the objective lens 32, and so on, to be incident on the B/S 18.

(Rotation of Illumination Lens Barrel 20 and Positioning of Reflecting Mirror 37)

As mentioned above, in the microscope unit 100 according to the present embodiment, the illumination lens barrel 20 is configured able to revolve with respect to the main lens barrel 10. Now, in the case of a position with respect to the B/S 18 of the reflecting mirror 37 not having been suitably adjusted, there is a risk that when the illumination lens barrel 20 is rotated with respect to the main lens barrel 10, a center position of the field stop 36 will end up deviating from an optical axis of the illumination optical system. Accordingly, the microscope unit 100 according to the present embodiment is configured to allow the position with respect to the B/S 18 of the reflecting mirror 37 to be adjusted. This point will be described below.

Figure 5A:
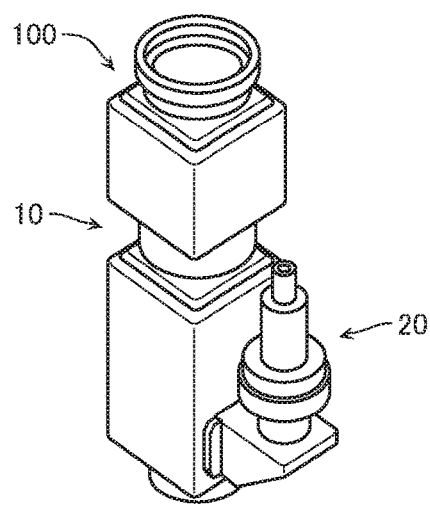
FIGS. 5a and 5b are diagrams for explaining a relationship between attitude of an illumination lens barrel with respect to a main lens barrel of the microscope unit and illumination range.
Figure 5B:
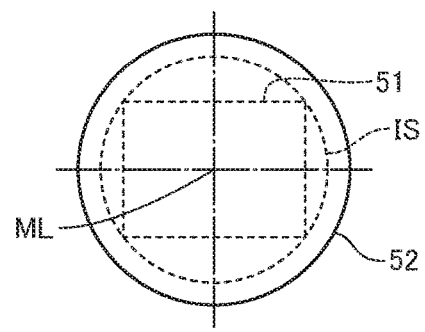
Figure 6A:
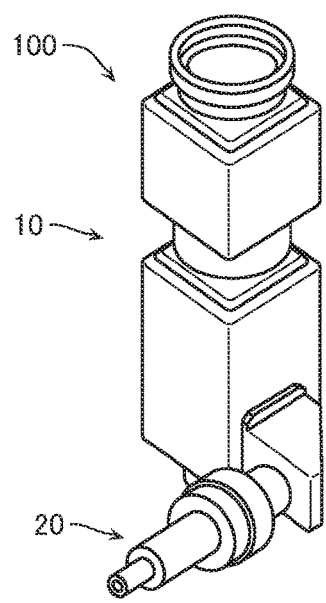
FIGS. 6a, 6b and 6c are diagrams for explaining illumination range in the case of fitting position adjustment having been completed and the case of fitting position adjustment not yet having been performed.
Figure 6B:
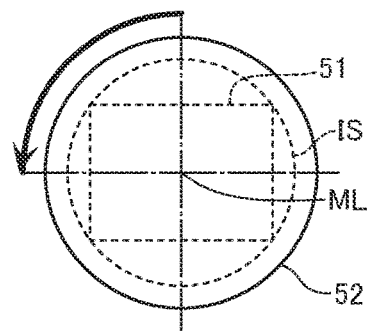
Figure 6C:
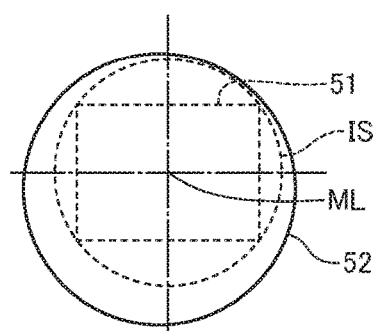

FIGS. 5a and 5b are diagrams for explaining a relationship between attitude of the illumination lens barrel 20 with respect to the main lens barrel 10 of the microscope unit 100 and illumination range. FIGS. 6a, 6b and 6c are diagrams for explaining illumination range in the case of fitting position adjustment having been completed and the case of fitting position adjustment not yet having been performed. Note that in FIGS. 5a, 5b, 6a, 6b and 6c, the outward appearance of the microscope unit 100 differs from that shown in FIGS. 1 and 2. Moreover, description is made here assuming fitting position and fitting angle of the B/S 18 of the main lens barrel 10 to have already been adjusted.

In the microscope unit 100 in the basic attitude with the optical axis ML of the main lens barrel 10 and the optical axis L1 of the first lens barrel 21 of the illumination lens barrel 20 being in the Z axis direction as shown in FIG. 5a, a center of an imaging range 51 in the imaging surface IS and center of an illumination range 52 of light from the light source LS that has passed through the illumination lens barrel 20 are fixed at a regular position centered on the optical axis ML of the main lens barrel 10, that is, at such a position that the center of the imaging range 51 and center of the illumination range 52 will coincide with the optical axis ML, as shown in FIG. 5b.

In the microscope unit 100 according to the present embodiment, it is possible for the illumination lens barrel 20 to be rotated by 90° around the optical axis L2 with respect to the main lens barrel 10, for example, from this basic attitude, as shown in FIG. 6a. As a result, the illumination range 52 rotates by 90° with an image of the imaging range 51 left unchanged.

Now, if, for example, fitting position of the mirror frame member 40 has been adjusted by the above-mentioned position adjusting mechanism, it is possible, as shown in FIG. 6b, for a state where the center of the imaging range 51 and center of the illumination range 52 coincide with the optical axis ML to be maintained, regardless of there having been a change in attitude indicated by the arrow in the drawing.

On the other hand, in the case of fitting position of the mirror frame member 40 not having been adjusted, the center of the illumination range 52 will end up being in a state of having greatly deviated from the center of the imaging range 51, as shown in FIG. 6c, hence illumination distribution by the light source LS in a visual field will end up getting ununiform.

In order to avoid such a situation, in the microscope unit 100 according to the present embodiment, a position of fitting to the intermediate lens barrel 22 of the mirror frame member 40 is adjusted via the position adjusting mechanism. Adjustment of fitting position of the mirror frame member 40 is performed in such a manner that, for example, subsequent to the illumination lens barrel 20 having been assembled, above-mentioned adjustment screws are operated, whereby a disposing position in the X axis direction with respect to the intermediate case of portion 28 of the mirror frame member 40 and a disposing position in a rotation direction centered on the X axis direction with respect to the intermediate case of portion 28 of the mirror frame member 40, are adjusted.

Adjustment is performed so that an amount of eccentricity of the optical axis L2 accompanying a change in attitude of the first lens barrel 21 at a time when the optical axis L1 of light from the light source LS is converted into light of the optical axis L2 by the reflecting mirror 37, will fall within a certain range. This makes it possible for attitude with respect to the main lens barrel 10 of the illumination lens barrel 20 to be freely changed, without the illumination range 52 due to the illumination optical system deviating.

(Downsizing of Microscope Unit)

Up to now, there has been known a microscope unit comprising: a main lens barrel of an imaging optical system, the main lens barrel being configured capable of being fitted with an imaging sensor and an objective lens; and an illumination lens barrel of an illumination optical system, the illumination lens barrel being connected to the main lens barrel and configured capable of being fitted with a light source. Such a microscope unit is configured so that, for example, a light flux (a flux of diverging light rays) that has been emitted from the light source is collected by a collector lens, passes through a relay lens system and field stop to be reflected by a mirror, and passes through a relay lens system, aperture stop, and condenser lens to illuminate an observation surface.

Such a microscope unit is sometimes capable of being fitted with a variety of light sources. However, it has sometimes been the case that, depending on a kind of light source fitted to the microscope unit, illumination at the observation surface ends up getting ununiform. Accordingly, in the microscope unit 100 according to the present embodiment, the illumination optical system has the fly-eye lens 34 disposed therein, whereby uniformity of illumination at the observation surface is achieved.

However, in the case of such a configuration being adopted, the number of optical components configuring the illumination optical system increases, so that sometimes, total length ends up increasing, and it ends up getting more difficult for downsizing to be achieved. Accordingly, in the illumination lens barrel 20 of the microscope unit 100 according to the first embodiment, downsizing of the microscope unit is achieved by a method of the kind described below.

(Addition of First Relay Lens Group 35)

As mentioned above, the first relay lens group 35 according to the first embodiment comprises the first lens 35a and second lens 35b that are not joined to each other. As mentioned above, such a configuration enables the focal distance to the later-mentioned field stop 36 to be made smaller while at the same time enabling the amount of spherical aberration to be suppressed more, compared to when a single lens or a biconvex lens of the likes of a cemented lens is adopted as the first relay lens. Hence, even though the first relay lens group 35 in addition to the fly-eye lens 34 is housed within the first lens barrel 21, the focal distance from the first relay lens group 35 to the field stop 36 can be designed short, so it is possible for total length of the first lens barrel 21 to be configured short. As a result, total length of the illumination lens barrel can be shortened, whereby downsizing of the illumination lens barrel overall is achieved, and, consequently, downsizing of the microscope unit is achieved. Note that from a viewpoint of downsizing of the illumination lens barrel overall, it is suitable for distance in an optical path from the first relay lens group 35 to the second relay lens 38 to be set so as to be no more than five times an outer diameter of the second relay lens 38, for example. Doing so makes it possible for total length of the illumination lens barrel to be designed short.

(Position Adjustment of Field Stop 36)

In the microscope unit 100 according to the first embodiment, the field stop 36 is disposed more inwardly than the outer peripheral surface of the intermediate lens barrel 22 is. Hence, it is possible for space inside the first lens barrel 21 to be utilized more effectively compared to in such a case as when, for example, the field stop 36 is disposed more outwardly than the outer peripheral surface of the intermediate lens barrel 22 (for example, more to the upper side than the lower end surface 27d of the flange portion 27c of the sixth sleeve portion 27 in FIG. 1) is. This makes it possible for total length of the illumination lens barrel to be shortened, whereby downsizing of the illumination lens barrel overall is achieved, and, consequently, downsizing of the microscope unit is achieved.

In the case of downsizing of the microscope unit 100 being achieved by such a configuration, the field stop 36 is desirably disposed brought as close as is possible to a vicinity of the reflecting mirror 37. For example, as shown in FIG. 1, the field stop 36 is desirably disposed more inwardly than an inner peripheral surface 28e of the intermediate lens barrel 22. However, if the field stop 36 ends up interfering with the light flux of the reflecting mirror 37, then there ends up occurring deterioration in illumination performance (deterioration in uniformity of brightness or illumination) of the illumination optical system. Hence, as shown in FIG. 1, for example, the field stop 36 is desirably sufficiently separated from the reflecting mirror 37 to prevent it from interfering with the light flux of the reflecting mirror 37. Moreover, as mentioned above, the field stop 36 and the focal position of the objective lens 32 are configured to be in a conjugate relationship. Now, if the reflecting mirror 37 is not positioned outside a range of focal depth of the field stop 36, then there is a risk of dirt or scratches, and so on, on a surface of the reflecting mirror 37 ending up being projected onto the imaging surface IS. Hence, the reflecting mirror 37 is desirably provided outside the range of focal depth of the field stop 36.

Note that the sixth sleeve portion 27 of the illumination lens barrel 20 according to the present embodiment has the truncated conical portion 27a formed in its lower end portion in FIG. 1, and a lower end portion of this truncated conical portion 27a configures the field stop 36. Such a field stop 36 can be produced by a single chuck by a lathe device, or the like, for example, at a time of the sixth sleeve portion 27 being formed, so is capable of being manufactured with high accuracy while manufacturing man-hours are suppressed. Moreover, it is capable of being realized without components for a separate stop, or the like, being used.

Moreover, as mentioned above, in the microscope unit 100 according to the present embodiment, the illumination lens barrel 20 is capable of being rotated with respect to the main lens barrel 10. Now, depending on configuration of the field stop, there is a risk that when the illumination lens barrel 20 is rotated with respect to the main lens barrel 10, a center position of the field stop will end up deviating from the optical axis of the illumination optical system. Now, the field stop 36 according to the present embodiment is configured from part of the sixth sleeve portion 27 housing the first relay lens group 35. Hence, it is possible for a positional relationship of the center position of the field stop and the optical axis of the illumination optical system to be suitably maintained, even when the illumination lens barrel 20 has been rotated with respect to the main lens barrel 10.

Other Embodiments

Each portion of the microscope unit 100 in the above-mentioned embodiment is capable of having its outer shape, dimensions, and so on, appropriately changed. For example, it is also possible for the case of main body portion 13 of the main lens barrel 10 to be formed in a cylindrical shape, and for an entirety from the first sleeve portion 11 to the third sleeve portion 14 to be formed in a cylindrical shape. Moreover, it is also possible for the first sleeve portion 11, second sleeve portion 12, and third sleeve portion 14 to be formed in a rectangular shape, and for the entirety from the first sleeve portion 11 to the third sleeve portion 14 to be formed in a rectangular (rectangular tubular) shape. Furthermore, it is also possible for outer diameters of the first through third sleeve portions 11, 12, 14 to be made different from what was mentioned above. The above changes may be applied to the illumination lens barrel 20 too. Moreover, portions of the microscope unit 100 exemplified as configurations consisting of a plurality of members may be configured from a single member, or portions of the microscope unit 100 exemplified as configurations consisting of a single member may be configured from a plurality of members.

While certain embodiments have been described, these embodiments have been presented by way of example only, and are not intended to limit the scope of the inventions. Indeed, the novel methods and systems described herein may be embodied in a variety of other forms: furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A microscope unit comprising:
a main lens barrel of an imaging optical system, the main lens barrel extending along a first optical axis and being configured to be fitted with an imaging sensor and an objective lens;
an intermediate lens barrel extending along a second optical axis orthogonal to the first optical axis, and including an end in a direction in which the second optical axis extends connected to an outer peripheral surface of the main lens barrel; and
a first lens barrel extending along a third optical axis orthogonal to the second optical axis, and including an end in a direction in which the third optical axis extends connected to an outer peripheral surface of the intermediate lens barrel, and being configured to be fitted with a light source, wherein the first lens barrel houses:
a collector lens that collects light that has been irradiated from the light source;
a fly-eye lens allowing to be transmitted therethrough light from the collector lens; and
a first relay lens that relays light from the fly-eye lens;
the intermediate lens barrel houses:
a field stop that stops down a range of light from the first relay lens;
a reflecting mirror that reflects light from the first relay lens the range of which is stopped down by the field stop toward the main lens barrel; and
a second relay lens that relays light to a beam splitter from the reflecting mirror;
the main lens barrel houses the beam splitter provided on the first optical axis, the beam splitter guiding at least a part of light incident thereon to the objective lens and allowing to be transmitted therethrough to a side of the imaging sensor at least a part of light incident thereon from the objective lens,
the end of the first lens barrel in the direction in which the third optical axis extends comprises a truncated conical portion formed in a truncated conical shape tapering toward the reflecting mirror,
the truncated conical portion is inserted in the intermediate lens barrel, and configures the field stop, and
the first relay lens has a plurality of lenses that are not joined to each other.

2. The microscope unit according to claim 1, wherein distance in an optical path from the first relay lens to the second relay lens is no more than five times an outer diameter of the second relay lens.

3. The microscope unit according to claim 2, wherein the first relay lens has a first lens and a second lens that each consist of a plano-convex lens, and
the first lens and the second lens are disposed so that their fellow convex surfaces face each other.

4. The microscope unit according to claim 3, wherein the reflecting mirror is housed in the intermediate lens barrel in a state of being held in a mirror frame member.

5. The microscope unit according to claim 3, wherein the intermediate lens barrel and the first lens barrel are configured to be capable of revolving around the second optical axis with respect to the main lens barrel.

6. The microscope unit according to claim 2, wherein the reflecting mirror is housed in the intermediate lens barrel in a state of being held in a mirror frame member.

7. The microscope unit according to claim 6, wherein the truncated cone portion is disposed more inwardly than an outer peripheral surface of the mirror frame member is.

8. The microscope unit according to claim 2, wherein the intermediate lens barrel and the first lens barrel are configured to be capable of revolving around the second optical axis with respect to the main lens barrel.

9. The microscope unit according to claim 1, wherein the first relay lens has a first lens and a second lens that each consist of a plano-convex lens, and the first lens and the second lens are disposed so that their fellow convex surfaces face each other.

10. The microscope unit according to claim 9, wherein the reflecting mirror is housed in the intermediate lens barrel in a state of being held in a mirror frame member.

11. The microscope unit according to claim 10, wherein the truncated cone portion is disposed more inwardly than an outer peripheral surface of the mirror frame member is.

12. The microscope unit according to claim 9, wherein the intermediate lens barrel and the first lens barrel are configured to be capable of revolving around the second optical axis with respect to the main lens barrel.

13. The microscope unit according to claim 1, wherein the reflecting mirror is housed in the intermediate lens barrel in a state of being held in a mirror frame member.

14. The microscope unit according to claim 13, wherein the truncated cone portion is disposed more inwardly than an outer peripheral surface of the mirror frame member is.

15. The microscope unit according to claim 1, wherein the intermediate lens barrel and the first lens barrel are configured to be capable of revolving around the second optical axis with respect to the main lens barrel.

* * * * *